United States Patent

[11] 3,626,068

[72] Inventor John T. Suh
 Mequon, Wis.
[21] Appl. No. 710,633
[22] Filed Mar. 5, 1968
[45] Patented Dec. 7, 1971
[73] Assignee Colgate-Palmolive Company
 New York, N.Y.
 Continuation-in-part of application Ser. No.
 621,421, Mar. 8, 1967, now abandoned.
 This application Mar. 5, 1968, Ser. No.
 710,633

[54] DERIVATIVES OF 3,4-DIHYDROBENZOTHIENO
 [2,3-C]PYRIDINE AND 3,4-DIHYDRO-5H-
 BENZOTHIENO[2,3-C]AZEPINE IN
 PHARMACEUTICAL COMPOSITIONS TO ENDUCE
 CENTRAL NERVOUS SYSTEM DEPRESSION
 4 Claims, No Drawings

[52] U.S. Cl...................................................... 424/263,
 424/248, 424/250, 424/267, 424/275, 260/247.1,
 260/293.4, 260/294.8 B, 260/330.5
[51] Int. Cl....................................................... A61k 27/00

[50] Field of Search............................................ 424/263;
 260/294.8 B

[56] References Cited
 UNITED STATES PATENTS
 3,497,528 2/1970 Suh ............................. 260/294.8 B Primary Examiner—Stanley J. Friedman
Attorneys—T. F. Kryshak and M. L. Youngs ABSTRACT: The compounds are 1-substituted-3,4-dihydrobenzothieno[2,3-C]pyridines and 1-substituted-3,4,dihydri-5H-benzothieno[2,3-C]azepines which in the form of pharmaceutical compositions are useful as antihypertensive and antipsychotic agents. They are preferably prepared by treating an amide of a corresponding β-/or γ-(3-thianaphthenyl)alkylamine with phosphorous oxychloride and phosphorus pentoxide under reflux conditions in an inert organic solvent to effect ring closure. Compounds disclosed include 1-propyl-3,4-dihydrobenzothieno[2,3-C]pyridine and 1-phenyl-3,4-dihydro-5H-benzothieno[2,3-C]azepine.

DERIVATIVES OF 3,4-DIHYDROBENZOTHIENO [2,3-C]PYRIDINE AND 3,4-DIHYDRO-5H-BENZOTHIENO[2,3-C]AZEPINE IN PHARMACEUTICAL COMPOSITIONS TO ENDUCE CENTRAL NERVOUS SYSTEM DEPRESSION

RELATED APPLICATION

This application is a continuation-in-part of my copending application Ser. No. 621,421 filed Mar. 8, 1967 now abandoned.

DETAILED DESCRIPTION

The compounds employed in the compositions of the present invention have the following formula

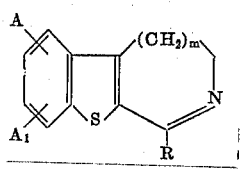

in which m is selected from 1 or 2 and wherein A and $A_1$ are selected from hydrogen, hydroxy, nitro, lower alkyl groups of one to four carbon atoms such as methyl, ethyl and isopropyl, lower alkoxy groups such as methoxy, ethoxy and propoxy, halo such as bromo, chloro and fluoro and trifluoromethyl, and R is an alkyl group of 1 to 7 carbon atoms such as methyl, ethyl, isopropyl or butyl, phenyl, a halophenyl such as o-chloro phenyl, p-bromophenyl and o-fluorophenyl, a lower-alkoxyphenyl such as p-methoxyphenyl, dimethoxyphenyl and trimethoxyphenyl, an aralkyl of seven to 11 carbon atoms such as benzyl, phenylisopropyl and phenethyl, and including nuclear-substituted phenyl-lower alkyls such as o-chlorobenzyl and dimethoxybenzyl, cyclo alkyl of three to seven carbon atoms including cyclohexyl and cyclopentyl, cycloalkyl-lower alkyl groups in which the cycloalkyl has three to seven carbon atoms such as cyclohexylmethyl or cyclopentyl ethyl, and a heterocyclic group such as pyridyl, piperidyl, furyl, thienyl, pyrryl and pyrrolidyl and B—Am in which B is an alkylene of one to six carbon atoms and Am is selected from

in which $R_1$ and $R_2$ may be the same or different groups selected from hydrogen, lower alkyl of one to four carbon atoms, lower alkyl such as hydroxy ethyl, a lower alkenyl of three to six carbon atoms such as allyl and hexenyl, phenyl, including nuclear substituted phenyl, particularly a halophenyl such as o-chlorophenyl and an alkoxyphenyl such as p-methoxyphenyl, cycloalkyl groups, particularly those containing three to seven carbon atoms and including cyclohexyl and cyclopentyl, cycloalkyl-lower alkyl groups, particularly those in which the cycloalkyl contains three to seven carbon atoms such as cyclohexyl-methyl and cyclopentyl-ethyl, b. groups in which

represents an amino group such as morpholino, pyrrolidino, piperidino, N-lower alkyl piperazino groups such as N-methyl-piperazino, N-(phenyl-lower alkyl)-piperazino groups such as N-benzyl piperazino and 4-(alpha-methylphenethyl)-piperazino and N-(hydroxy-lower alkyl)-piperazino groups such as 4-(beta-hydroxyethyl)-piperazino, and c. cycline amine groups bonded through a nuclear carbon to B, including such groups as N-lower alkyl-2,3 or 4-piperidyls such as N-methyl-3-piperidyl, N-ethyl-4-piperidyl, N-ethyl-2-piperidyl and N-isopropyl-3-piperidyl, N-(di-lower alkyl amino-lower alkyl)-2,3 or 4-piperidyls such as N-(beta-dimethylaminopropyl)-4-piperidyl, N-(beta-diethylaminoethyl)-3-piperidyl and N-(beta-dimethylaminopropyl)-2-piperidyl, N-phenyl-lower alkyl-3 or 4-piperidyls such as N-benxyl-3-piperidyl, N-phenylethyl-4-piperidyl and N-phenyl-propyl-3-piperidyl, 2-piperidyl, 3-piperidyl and 4-piperidyl, 2-pyrrolidyl, 3-pyrrolidyl, N-lower alkyl-2 or 3-pyrrolidyls such as N-methyl-2-pyrrolidyl, N-ethyl-3-pyrrolidyl, N-propyl-4-pyrrolidyl, and N-phenyl-lower alkyl-2 or 3-pyrrolidyls such as N-benzyl-2-pyrrolidyl and N-phenylethyl-3-pyrrolidyl.

The basic starting materials employed in the preparation of the compounds of the present invention are β-(3-thianaphthenyl) alkylamines of the formula

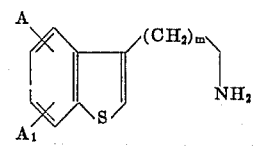

These amines may be prepared from the corresponding cyano compounds as described in the literature. [Herz J.A.C.S. 72, p. 4999 (1950)].

The starting materials may also be prepared by treating the corresponding acid with thionyl chloride followed by treatment with sodium azide and acid hydrolysis. The process may be illustrated as follows

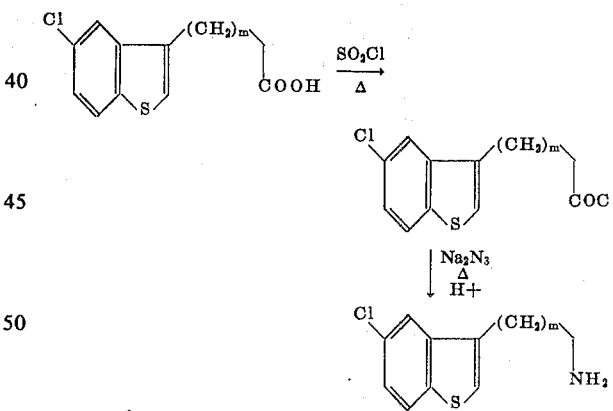

Representative of the amines which may be employed are the following:
β-(3-Thianaphthenyl) ethylamine,
γ-(3-Thianaphthenyl)propylamine,
β-(5-Chloro-3-thianaphthenyl)ethylamine,
γ-(5-Chloro-3-thianaphthenyl)propylamine,
β-(5-Hydroxy-3-thianaphthenyl)ethylamine,
γ-(5-Hydroxy-3-thianaphthenyl)propylamine,
β-(6-Trifluoromethyl-3-thianaphthenyl)ethylamine,
γ-(6-Trifluoromethyl-3-thianaphthenyl)propylamine,
β-(7-Methoxy-3-thianaphthenyl)ethylamine,
γ-(7-Methoxy-3-thianaphthenyl)propylamine, and
β-(4-Bromo-3-thianaphthenyl)ethylamine.

The novel compounds of the present invention are preferably prepared by treating the selected β-(3-thianaphthenyl) alkylamine with a conventional acylating agent, such as acyl halide, acid anhydride, mixed anhydride or ester, in a suitable solvent, such as benzene, toluene or xylene, preferably at reflux temperature to form the corresponding amide. The resulting amide is then preferably treated with phosphorus pentoxide and phosphorus oxychloride, in a suitable anhydrous solvent such as zylene or toluene, to form the ring unsaturated derivative.

The above-described process may be illustrated as follows:

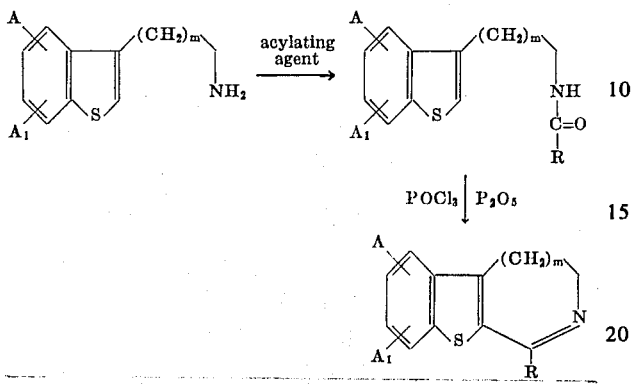

wherein A, $A_1$ and R are as described and represent groups which do not interfere with or partake in the reactions.

Representative of the acylating agents which may be employed are the following:
Acetyl chloride,
Acetyl bromide,
Acryloyl chloride,
β-Nitropropionyl chloride,
Propionyl chloride,
Propionyl iodide,
n-Butyryl chloride,
Isobutyryl chloride,
Benzoyl chloride,
Acetic anhydride,
Propionic anhydride,
Ethyl formate,
Benzyl formate,
4-Pyridinecarbonyl chloride,
3-Furancarbonyl chloride,
2-Thiophenecarbonyl chloride,
p-Methoxyphenylacetyl chloride,
3,4-Dimethoxyphenylacetyl chloride,
γ-(N-Methylpiperazino)butyryl chloride,
β-(N-Methylpiperazino)propionyl chloride,
β-(Morpholino)propionyl chloride,
β-[3-(N-Methyl)pyrrolidyl]propionyl chloride, and
γ-(Piperidyl)butyryl chloride.

Representative of some of the amides prepared by the process are the following:
N-Acetyl-β-(3-thianaphthenyl)ethylamine,
N-Acetyl-γ-(3-thianaphthenyl)propylamine,
N-3-Nitropropionyl-β-(3-thianaphthenyl)ethylamine,
N-(3,4-Dimethoxyphenylacetyl)-β-(3-thianaphthenyl)ethylamine,
N-(3,4-Dimethoxyphenylacetyl)-γ-(3-thianaphthenyl)propylamine,
N-Acryloyl-β-(3-thianaphthenyl)ethylamine,
N-Acryloyl-γ(3-thianaphthenyl)propylamine,
N-(Propionyl)-β-(3-thianaphthenyl)ethylamine,
N-(Propionyl)-γ-(3-thianaphthenyl)propylamine,
N-(p-Methoxyphenylacetyl)-β-(3-thianaphthenyl)ethylamine,
N-(p-Methoxyphenylacetyl)-γ-(3-thianaphthenyl)propylamine,
N-iso-Butyryl-β-(3-thianaphthenyl)ethylamine,
N-iso-Butyryl-γ-(3-thianaphthenyl)propylamine,
N-Butyryl-β-(3-thianaphthenyl)ethylamine,
N-Butyryl-γ-(3-thianaphthenyl)propylamine,
N-[β-(N'-Methylpiperazino)propionyl]-β'-(3-thianaphthenyl)ethylamine,
N-Methyl-N-[β-(diethylamino)propionyl]-β'-(5-chloro-3-thianaphthenyl)ethylamine,
N-β-Morpholinopropionyl-β'-(6-trifluoromethyl-3-thianaphthenyl)ethylamine,
N-β-[3-(N-Ethyl)pyrrolidyl]propionyl-β'-(7'-methoxy-3'-thianaphthenyl)ethylamine,
N-Dimethylaminoacetyl-β-(5-fluoro-3-thianaphthenyl)ethylamine,
N-Dimethylaminoacetyl-γ-(5-fluoro-3-thianaphthenyl)propylamine,
N-γ-(Diethylamino)butyryl-β'-(5hydroxy-3-thianaphthenyl)ethylamine, and
N-β-(N'-Hydroxyethylpiperazino)propionyl-β'-(5-trifluoromethyl-3-thianaphthenyl)ethylamine.

Representative of the 3,4-dihydrobenzothieno[2,3-C]pyridines which may be prepared by the described process are the following:
1-iso-Propyl-3,4-dihydrobenzothieno[2,3-C]pyridine,
1-iso-Propyl-3,4-dihydro-5H-benzothieno[2,3-C]azepine,
1-Ethyl-3,4-dihydrobenzothieno[2,3-C]pyridine,
1-Ethyl-3,4-dihydro-5H-benzothieno[2,3-C]azepine,
1-Propyl-3,4-dihydrobenzothieno[2,3-C]pyridine,
1-Propyl-3,4-dihydro-5H-benzothieno[2,3-C]azepine,
1-(β-Diethylaminoethyl)-6-hydroxy-3,4-dihydrobenzothieno[2,3-C]pyridine,
1-(β-Diethylaminoethyl)-6-hydroxy-3,4-dihydro-5H-benzothieno[2,3-C]azepine,
1-(4-Pyridyl)-3,4-dihydrobenzothieno[2,3-C]pyridine,
1-(4-Pyridyl)-3,4-dihydro-5H-benzothieno[2,3-c]azepine,
1-(3-Furyl)-3,4-dihydrobenzothieno[2,3-C]pyridine,
1-(3-Furyl)-3,4-dihydro-5H-benzothieno[2,3-C]azepine,
1-(2-Thienyl)-3,4-dihydrobenzothieno[2,3-C]pyridine,
1-(2-Thienyl)-3,4-dihydro-5H-benzothieno[2,3-C]azepine,
1-Methyl-3,4-dihydrobenzothieno[2,3-C]pyridine,
1-Methyl-3,4-dihydro-5H-benzothieno[2,3-C]azepine,
1-(3',4'-Dimethoxyphenyl)-3,4-dihydrobenzothieno[2,3-C]pyridine,
1-(3',4'-Dimethoxyphenyl)-3,4-dihydro-5H-benzothieno[2,3-C]azepine,
6-Chloro-1-ethyl-3,4Dihydrobenzothieno[-C]pyridine,
6-Chloro-1-ethyl-3,4-dihydro-5H-benzothieno[2,3-C]azepine,
1-Phenyl-3,4-dihydro-5H-benzothieno[2,3-C]azepine,
1-[4-(N-Methylpiperidyl)]-7-trifluoromethyl-3,4-dihydrobenzothieno[2,3-C]pyridine,
-[β-(N-Hydroxyethylpiperazino)ethyl]-7-methoxy-3,4-dihydrobenzothieno[2,3-C]pyridine, and
6-Hydroxy-1(N-methylpiperazinoethyl)-3,4-dihydrobenzothieno[2,3-C]pyridine.

The novel compounds of the present invention may be used as intermediates in the preparation of more complex chemical and pharmaceutical compounds such as the corresponding 1,2,3,4-tetrabenzothieno[2,3-C]pyridines which are antipsychotic agents. In addition, because of their antiserotonin properties these compounds are valuable as pharmacological tools. Furthermore, the described 3,4-dihydrobenzothieno[2,3-C] pyridines have been found to be useful when combined with a major amount of one or more pharmaceutical diluents and formed into unit dosage forms for the treatment and control of hypertension and especially antisocial aggressive behavior in animals. For example, the compounds 1-propyl-3,4-dihydro-benzothieno[2,3-C]pyridine and 1-iso-propyl-3,4-dihydrobenzothieno[2,3-C]pyridine were effective when administered intraperitoneally in doses of about 20 mg./kg. in decreasing antisocial aggressiveness, viciousness and persistency for fighting, generally found in isolated mice.

The compounds
1-Methyl-3,4-dihydrobenzothieno[2,3-C]pyridine,
1-Propyl-3,4-dihydrobenzothieno[2,3-C]pyridine, and
1-iso-Propyl-3,4-dihydrobenzothieno[2,3-C]pyridine,
were found to lower blood pressure when administered in 3.0 and 10.0 mg./kg. intravenous doses to the vagotomized, anesthesized dog preparation, which is a standard animal preparation for testing for antihypertensive activity.

In animal behavioral screening tests the compound 1- methyl-3,4-dihydrobenzothieno[2,3-C]pyridine exhibited a central nervous system depressant activity. In mice receiving 10 to 100 mg./kg. of the compounds intraperitoneally in the form of a 5 percent acacia suspension behavioral characteristics generally associated with central nervous system depression were observed. As a result of the behavioral studies the compound was found to have an $LD_{50}$ of 175 mg./kg. The behavioral studies were conducted in accordance with the procedures set forth by Irwin in "Animal and Clinical Pharmacologic Techniques of Drug Evaluation," J. H. Nodine and P. E. Siegler, Ed., Year Book Publishers, Inc. 1964, pp. 36–54.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like, may also be employed.

The unit dosage forms may contain a concentration of 0.1 percent to 10 percent or more by weight of one or more of the novel compounds. Generally, such dosage forms will contain about 5 to 250 mg. of the active ingredients. One or more of such dosage forms may be administered daily.

A typical tablet may have the following composition:

|   | Mg. |
|---|---|
| (1) Active Ingredient | 20 |
| (2) Starch U.S.P. | 57 |
| (3) Lactose U.S.P. | 73 |
| (4) Talc U.S.P. | 9 |
| (5) Stearic Acid | 6 |

Powders 1, 2 and 3 are slugged, then granulated, mixed with 4 and 5, and tableted.

Capsules may be prepared by filling No. 3 hard gelatin capsules with a mixture of the following ingredients:

|   | Mg. |
|---|---|
| (1) Active Ingredient | 15 |
| (2) Lactose U.S.P. | 200 |
| (3) Starch U.S.P. | 16 |
| (4) Talc U.S.P. | 8 |

In addition to the above-described formulations, those skilled in the art may readily formulate solutions intended for parenteral dosage and oral suspensions without departing from the spirit and scope of the invention.

The novel compounds in which R is B-Am may also be use to form salts with penicillins. The thus formed salts may then be used to aid in the isolation and purification of such antibiotics.

Acid addition salts of the compounds of the present invention may be conveniently prepared by contacting the compounds which are capable of forming such salts with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the salt-forming compounds with a suitable alkylating agent such as dimethyl sulfate or an alkyl halide such as methyl chloride, methyl iodide or ethyl bromide.

The following examples are presented to illustrate this invention:

EXAMPLE 1

β-(3-Thianaphthenyl)ethylamine

To a suspension of 21 g. (0.55 mole) of lithium aluminum hydride in 450 ml. of anhydrous ether is added a solution of 31.7 g. (0.18 mole) of 3-cyanomethylthianaphthene in 350 ml. of anhydrous ether in 45 minutes. The mixture is stirred at room temperature for 3 hours after which the complex is decomposed by the dropwise addition of 80 ml. of water. The solids are removed by filtration and washed with ether. The filtrate is dried and concentrated in vacuo to yield a brown oil which is fractioned to yield β-(3-thianaphthenyl)ethylamine in the form of a clear liquid, b.p. 109°–110°/0.3 mm.

Anal. Calcd. for $C_{10}H_{11}NS$: C, 67.75; H, 6.26; N, 7.90.
Found: C, 67.49; H, 6.50; N, 7.92.

EXAMPLE 2

N-β-(3Thianaphthenyl)ethylacetamide

To 5.6 g. (0.03 mole) of β-(3-thianaphthenyl)ethylamine is added 72 ml. of 20 percent sodium hydroxide solution with cooling in 10 minutes. Acetic anhydride (20 ml.) is then added dropwise with cooling within 15 minutes, after which the mixture is stirred with cooling for 1 hour and at room temperature for 16 hours. The mixture is extracted three times with 100 ml. portions of ether. The extracts are combined and washed three times with 50 ml. of brine, dried, and concentrated in vacuo to yield a clear liquid which is crystallized from benzene/petroleum-ether to yield N-β-(3-thianaphthenyl)ethylacetamide in the form of a white crystalline solid, m.p. 67°–68.5°.

Anal. Calcd. for $C_{12}H_{13}NOS$: S, 14.62.
Found: S, 14.73.

EXAMPLE 3

1-Methyl-3,4-dihydrothianaphtheno[2,3-C]pyridine

A mixture of 2.4 g. of phosphorus pentoxide, 1.3 g. of N-β-(3-thianaphthenyl)ethylacetamide, and 2.4 g. of phosphorus oxychloride in 40 ml. of anhydrous xylene (over sodium) is allowed to reflux under nitrogen for 70 minutes.

The mixture is decomposed with ice and the mixture stirred until a clear aqueous layer is formed. The aqueous layer is separated, washed with benzene, made basic with concentrated sodium hydroxide solution, and extracted with three 100 ml. portions of benzene. The combined benzene extracts are dried over anhydrous sodium sulfate and the solvent distilled under diminished pressure to give a solid product. After one recrystallization from petroleum ether 1-methyl-3,4-dihydrothianaphtheno[2,3-C]pyridine, m.p. 73.5°, in the form of light yellow needles is obtained.

Anal. Calcd. for $C_{12}H_{11}NS$: S, 15.97.
Found: S, 15.98.

EXAMPLE 4

1-Ethyl-3,4-dihydrothianaphtheno[2,3-C]pyridine

A mixture of 11.1 g. (0.078 mole) of phosphorus pentoxide, 11.1 g. (0.072 mole) of phosphorus oxychloride and 6.4 g. (0.072 mole) of N-propionyl-β-(3-thianaphthenyl)ethylamine in 150 ml. of xylene is refluxed for 2 hours. It is cooled, 200 ml. of water added and the mixture stirred 0.5 hours. The aqueous layer is separated and basified with sodium hydroxide. It is extracted twice with 125 ml. portions of ether which are dried and concentrated to yield 1-ethyl-3,4-dihydrothianaphtheno[2,3-C]pyridine in the form of a yellow solid, m.p. 72°–75°.

EXAMPLE 5

Diethyl α-(5-chloro-3-thianaphthenylmethyl)malonate

To a solution of 3.8 g. (0.16 mole) of Na in 175 ml. of ethanol is added 33 g. (0.2 mole) of diethyl malonate and the mixture is stirred 1 hour at 25°. A solution of 35.6 g. (0.14 mole) of 5-chloro-3-bromomethylthianaphthene in 100 ml. of benzene is added in 15 minutes, the mixture is stirred at 25° for 1 hour and refluxed 7 hours. The solution is cooled, diluted to 1.5 liters with water and extracted three times with 200 ml. portions of ether. The combined extracts are washed twice with 75 ml. portions of brine, dried and concentrated to yield diethyl α-(5-chloro-3-thianaphthenylmethyl)malonate in the form of a yellow red oil.

EXAMPLE 6

α-(5-Chloro-3-thianaphthenylmethyl)malonic acid

To a solution of 45.2 g. of KOH in 45 ml. of water is added 100 ml. of ethanol and 45.2 g. (0.13 mole) of diethyl α-(5-chloro-3-thianaphthenylmethyl)malonate and the mixture is refluxed 22 hours. The alcohol is removed in vacuo after which 200 ml. of water is added and the mixture extracted twice with 100 ml. portions of ether. The aqueous solution is treated with activated charcoal, acidified with concentrated HCl and cooled. The solids are collected and dried to yield α-(5-chloro-3-thianaphthenylmethyl)malonic acid in the form of a yellow solid, m.p. 175°–177°.

Anal. Calcd. for $C_{12}H_9ClO_4S$: S, 11.26.

Found: S, 11.42.

EXAMPLE 7

β-(5-Chloro-3-thianaphthenyl)propionic acid

α-(5-Chloro-3-thianaphthenyl-methyl)malonic acid (13.5 g., 0.048 mole) is heated at 190°–195° for 2 hours. It is cooled to 25° and 75 ml. are dissolved. It is cooled, extracted twice with 35 ml. of chloroform, treated with activated charcoal and acidified with 10 percent HCl solution. The solids are collected, washed and dried to yield β-(5-chloro-3-thianaphthenyl)propionic acid. An analytical sample is prepared by recrystallizing twice from ethanol and twice from methanol to yield β(5-chloro-3-thianaphthenyl)propionic acid in the form of a yellow solid, m.p. 187°–189°.

Anal. Calcd. for $C_{11}H_9ClO_2S$: C, 54.91; H, 3.77; Cl, 14.74; S, 13.32.

Found: C, 55.90; H, 3.79; Cl, 14.83; S, 13.27.

EXAMPLE 8

β-(5-Chloro-3-thianaphthenyl)ethylamine Hydrochloride

A mixture of 26.8 g. (0.11 mole) of α-(5-chloro-3-thianaphthene)propionic acid and 57 g. (35 ml., 0.48 mole) of $SOCl_2$ is heated to 50° in 0.5 hours and maintained at 50°–52° for 1 hour. The excess $SOCl_2$ is removed in vacuo. Benzene (50 ml.) is added to the residue and concentrated to yield β-(5-chloro-3-thianaphthenyl)propionyl chloride in the form of a yellow solid.

A mixture of 32 g. (0.12 mole) of β-(5-chloro-3-thianaphthenyl)propionyl chloride and 34 g. (0.51 mole) of $NaN_3$ in 200 ml. of toluene is refluxed for 23.5 hours. The mixture is cooled, filtered and the filtrate concentrated to yield a brown oil.

To the above oil is added 100 ml. of concentrated HCl with stirring at 25° for 15 minutes, at 80° for 0.5 hours after which it is refluxed for 6 hours. The mixture is cooled to 25° and 100 ml. of ether added and stirred 0.5 hours. The solids are collected, washed with ether and dried to yield a solid, m.p. 215°–237°. An analytical sample is prepared by recrystallizing from activated charcoal-treated ethanol to yield β-(5-chloro-3-thianaphthenyl)ethylamine hydrochloride in the form of a white solid, m.p. 248°–250°.

Anal. Calcd. for $C_{10}H_{11}Cl_2NS$: C, 48.38; H, 4.47; N, 5.64; S, 12.91.

Found: C, 48.18; H, 4.64; N, 5.48; S, 13.02.

EXAMPLE 9

N-Propionyl-β-(5-chloro-3-thianaphthenyl)ethylamine

To a solution of 5.9 g. (0.06 mole) of propionyl chloride in 100 ml. of benzene is added a solution of 5.1 g. (0.06 mole, 5.2 ml.) of pyridine and 6.7 g. (0.03 mole) of β-(5-chloro-3-thianaphthenyl)ethylamine in 100 ml. of benzene in 20 minutes at 10°. The mixture is stirred for 17 hours at 25° after which 100 ml. of water and 75 ml. of benzene are added and the mixture heated until all solids are dissolved. The organic layer is separated and washed successively with 50 ml. of 10 percent HCl twice with 100 ml. portions of 5 percent NaOH and once with 50 ml. of brine. It is dried ($Na_2SO_4$) and concentrated to yield N-propionyl-β-(5-chloro-3-thianaphthenyl)ethylamine in the form of a yellow solid, m.p. 93°–190°.

EXAMPLE 10

6-Chloro-1-ethyl-3,4-dihydrobenzothieno[2,3-C]pyridine

A mixture of 13.9 g. (0.1 mole) of $P_2O_5$, 13.9 g. (0.09 mole) of $POCl_3$ and 9.2 g. (0.03 mole) of N-propionyl-β-(5-chloro-3-thianaphthenyl)ethylamine in 250 ml. of xylene is refluxed for 2 hours. It is cooled, 500 ml. of water added and stirred at 80° for 0.5 hours. The aqueous layer is separated, cooled, extracted with 100 ml. of chloroform and filtered through diatomaceous earth. It is basified, while cooling, with flake NaOH. The precipitated solids are collected, washed with water and dried to yield 6chloro-1-ethyl-3,4-dihydrobenzothieno[2,3-C]pyridine in the form of a yellow solid, m.p. 105°–108°.

EXAMPLE 11

6-Chloro-1-ethyl-3,4-dihydrobenzothieno[2,3-C]pyridine

A mixture of 13.9 g. (0.1 mole) of $P_2O_5$, 13.9 g. (0.09 mole) of $POCl_3$ and 9.2 g. (0.03 mole) of N-propionyl-β- (5-chloro-3-thianaphthenyl)ethylamine in 250 ml. of xylene is refluxed for 2 hours. It is cooled, 500 ml. of water added and stirred at 80° for 0.5 hours. The aqueous layer is separated, cooled, extracted with 100 ml. of chloroform and filtered through diatomaceous earth. It is basified, while cooling, with flake NaOH. The precipitated solids are collected, washed with water and dried to yield 6-chloro-1-ethyl-3,4-dihydrobenzothieno[2,3-C]pyridine in the form of a yellow solid, m.p. 105°–108°.

EXAMPLE 12

N-(3,4-Dimethoxyphenylacetyl)-β-(3-thianaphthenyl)ethylamine

A solution of 16.7 g. (0.085 mole) of 3,4-dimethoxyphenyl acetic acid in 25.6 ml. (0.36 mole) of $SOCl_2$ is stirred at 20°–30° for 1.5 hours. The excess $SOCl_2$ is removed in vacuo, after which the residue is dissolved in 50 ml. of benzene and concentrated to yield 18.2 g. (100 percent) of a brown oil. The oil is dissolved in 100 ml. of benzene and to it is added a solution of 12.6 g. (0.07 mole) of β-(3-thianaphthenyl)ethylamine and 6.4 g. (0.08 mole) of pyridine in 50 ml. of benzene in 20 minutes at 10°–11°. The mixture is stirred at 25° for 1 hour after which 200 ml. of $ChCl_3$ and 75 ml. of $H_2O$ are added and stirred. The organic layer is separated and washed successively with 100 ml. of 10% HCl solution, twice with 100 ml. portions of 5% NaOH solution and once with 100 ml. of brine. It is then treated with activated charcoal and concentrated to yield an oil which is crystallized and recrystallized from ethyl acetate to yield N-(3,4-dimethoxyphenylacetyl)-β-(3-thianaphthenyl)ethylamine in the form of a yellow solid, m.p. 103°–105°.

EXAMPLE 13

1-(3',4'-Dimethoxybenzyl)-3,4-dihydrobenzothieno[2,3-C]pyridine

To a solution of 16.7 g. (0.117 mole) of phosphorus pentaoxide and 16.7 g. (0.109 mole, 10 ml.) of phosphorus oxychloride in 280 ml. of anhydrous xylene is added 14.6 g. (0.0412 mole) of N-(3,4-dimethoxyphenylacetyl)-β-(3-thianaphthenyl)ethylamine in 2 minutes. The mixture is heated to 120° in 0.5 hours and maintained for 40 minutes. The mixture is cooled to 25° and poured into 400 ml. of ice water. The mixture is then added to the original reaction flask and stirred with 10 percent sodium hydroxide solution (300 ml.) and 200 ml. of benzene at 50° for 3 hours. The organic layer is separated, treated with activated charcoal, dried, and concentrated to yield 1-(3',4'-dimethoxybenzyl)-3,4-dihydrobenzothieno[2,3-C]pyridine in the form of a dark yellow oil which solidifies upon cooling.

EXAMPLE 14

1-(β-Diethylaminoethyl)-3,4-dihydrobenzothieno[2,3-C]pyridine

A mixture of 6.2 g. (0.02 mole) of N(β'-diethylaminopropionyl)-β-(3-thianaphthenyl)ethylamine, 8.25 g. (0.058 mole) of $P_2O_5$ and 8.25 g. (0.054 mole) of $POCl_3$ in 150 ml. xylene is heated to 140° in 20 minutes and maintained at 130°–145° for 0.5 hours. The temperature is reduced to 95° in 40 minutes and then stirred at 25° for 1 hour. Water (500 ml.) is then added and the mixture heated to 80° in 1 hour. It is cooled to 25° and the aqueous layer is separated. It is extracted once with 50 ml. of xylene, filtered through diatomaceous earth and basified with flake NaOH. The mixture is extracted three times with $CHCl_3$. The extracts are washed with brine, dried ($Na_2SO_4$) and concentrated to yield 1-(β-diethylaminoethyl)-3,4-dihydrobenzothieno[2,3-C]pyridine in the form of a brown oil.

EXAMPLE 15

1-Propyl-3,4-dihydrobenzothieno[2,3-C]pyridine

A mixture of 40 g. (0.28 mole) $P_2O_5$, 40 g. (0.26 mole) of $POCl_3$ and 24.5 g. (0.10 mole) of N-(butyryl)-3-(β-aminoethyl)thianaphthene in 400 ml. of xylene is refluxed 2 hours. It is cooled, 500 ml. of water added and stirred 1 hour. The aqueous layer is separated, basified with solid NaOH and extracted four times with 150 ml. portions of ether. The combined extracts are washed with 75 ml. of brine, dried and concentrated to yield 1-propyl-3,4-dihydrobenzothieno[2,3-C]pyridine in the form of a yellow oil.

Anal. Calcd. for $C_{14}H_{15}NS$: S, 13.98.
Found: S, 13.85.

EXAMPLE 16

1-iso-Propyl-3,4-dihydrobenzothieno[2,3-C]pyridine

A mixture of 37 g. (0.24 mole) of $POCl_3$, 37 g. (0.26 mole) $P_2O_5$ and 22.5 g. (0.09 mole) of N-(iso-butyl)-3-(β-aminoethyl)thianaphthene in 370 ml. of xylene is refluxed for 2 hours. It is cooled, 450 ml. of water added and stirred 1 hour. The aqueous layer is separated and basified with NaOH. It is extracted four times with 125 ml. portions of chloroform. The combined extracts are washed with 75 ml. of brine, dried and concentrated to yield a solid which is dissolved in 100 ml. of benzene, filtered and concentrated to yield 1-iso-propyl-3,4-dihydrobenzothieno[2,3-C]pyridine in the form of a yellow solid, m.p. 48°–50°.

Anal. Calcd. for $C_{14}H_{15}NS$: S, 13.98.
Found: S, 13.89.

EXAMPLE 17

β-(3-Thianaphthenyl)propionamide

A mixture of 30 g. (0.145 mole) of 3-thianaphthenepropionic acid and 50 ml. (0.7 mole) of $SOCl_2$ is heated at 50°–67° for 1.5 hours and allowed to cool to 30° in 1.5 hours. It is concentrated in vacuo and the residue dissolved in 50 ml. of ether. It is added dropwise to 100 ml. of $NH_4OH$ solution at 5° in 0.5 hours. The mixture is heated until all ether has been removed, cooled and the solids collected and dried to yield β-(3-thianaphthenyl)propionamide as a white solid; m.p. 98°–100°.

Anal. Calcd. for $C_{11}H_{11}NSO$: C, 64.37; H, 5.40; N, 6.82.
Found: C, 64.87; H, 5.45; N, 6.84.

EXAMPLE 18

γ-(3-Thianaphthenyl)propylamine Hydrochloride

To a dispersion of 13.4 g. (0.354 mole) of $LiAlH_4$ in 200 ml. of ether is added a dispersion of 24.2 g. (0.118 mole) of 3-thianaphthenepropionamide in 800 ml. of ether in 0.5 hours. The mixture is refluxed for 16 hours after which 200 ml. of benzene is added and refluxed again for 1.5 hours. The complex is decomposed with 60 ml. of water and the solid removed by filtration. The filtrate is dried ($Na_2SO_4$), and concentrated to yield a theoretical amount of an oil. A 3.0 g. portion of this material is dissolved in ether and acidified with ethereal HCl. The solids are collected and recrystallized twice from 2-propional to yield γ-(3-thianaphthenyl)propylamine hydrochloride as white crystals, m.p. 187°–189°.

Anal. Calcd. for $C_{11}H_{14}ClNS$: C, 58.00; H, 6.20; N, 6.16.
Found: C, 58.27; H, 6.30; N, 6.16.

EXAMPLE 19

N-Propionyl-γ-(3-thianaphthenyl)propylamine

To a solution of 9.1 g. (0.098 mole) of propionyl chloride in 150 ml. of benzene is added a solution of 15 g. (0.0784 mole) of γ-(3-thianaphthenyl)propylamine and 7.75 g. (0.098 mole) of pyridine in 0.5 hours at 10°. The mixture is stirred at 10° for 1 hour, at 25° for 17.5 hours, and refluxed for 1.5 hours. The mixture is cooled and 100 ml. of water added and stirred 5 minutes. The organic layer is separated and washed successively with 100 ml. 10% HCl solution and 50 ml. of brine. It is dried ($Na_2SO_4$) and concentrated to yield the theoretical amount of a yellow oil. A 5.0 g. portion is chromatographed through alumina using varying proportions of benzene/petroleum ether and ether/benzene to yield an oil which crystallized on standing to yield a light yellow solid, m.p. 55°–57.5°.

Anal. Calcd. for $C_{14}H_{17}NSO$: C, 67.97; H, 6.92; N, 5.66; S, 12.95.
Found: C, 68.21; H, 6.92; N, 5.53; S, 13.08.

EXAMPLE 20

1-Ethyl-3,4-dihydro-5H-benzothieno[2,3-C]azepine Fumarate Ethanolate

A mixture of 10 g. (0.0404 mole of N-(propionyl)-3-(γ-aminopropyl)thianaphthene, 16.4 g. (1.15 moles) of $P_2O_5$ and 16.4 g. (1.06 moles of $POCl_3$ in 250 ml. of xylene is refluxed for 2 hours. The mixture is cooled and 400 ml. of water added. The mixture is basified with NaOH flakes after which 200 ml. of $CHCl_3$ is added and stirred 15 minutes. The organic layer is separated, washed with brine, dried ($Na_2So_4$) and concentrated to yield a brown oil which is chromatographed through alumina using benzene as the eluent to yield a yellow oil which crystallized upon standing.

A portion of this material (2.5 g., 0.011 mole) is dissolved in 20 ml. of ethanol and added to a solution of 1.4 g. (0.012 mole) of fumaric acid in 25 ml. of ethanol, filtered and cooled. The solids are collected and dried to yield 1-ethyl-3,4-dihydro-5H-benzothieno[2,3-C]azepine fumarate ethanolate as a yellow solid, m.p. 158°–160°.

Anal. Calcd. for $C_{20}H_{25}NSO_5$: C, 61.40; H, 6.40; N, 3.58; S, 8.19.
Found: C, 61.45; H, 6.72; N, 3.60; S, 8.15.

We claim:
1. A pharmaceutical composition intended for administration to animals to induce a central nervous system depression in such animals, which composition comprises in combination a pharmaceutical diluent and a compound of the formula

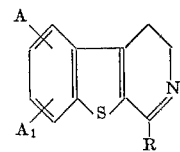

in which A and $A_1$ are selected from hydrogen and halo and R is an alkyl of one to four carbon atoms in an amount sufficient to induce such depression.

2. A composition of claim 1 in which A and $A_1$ are hydrogen and R is propyl.

3. A composition of claim 1 in which A and $A_1$ are hydrogen and R is methyl.

4. A composition of claim 1 in which R is isopropyl.

* * * * *